United States Patent

Shyr

(10) Patent No.: US 6,717,810 B2
(45) Date of Patent: Apr. 6, 2004

(54) POSITIONING AND HEAT DISSIPATING DEVICE OF INTERFACE CARD

(75) Inventor: Daniel Shyr, Taipei (TW)

(73) Assignee: Avance Technologies Inc., Taipei (TW)

( * ) Notice: Subject to any disclaimer, the term of this patent is extended or adjusted under 35 U.S.C. 154(b) by 0 days.

(21) Appl. No.: 10/400,960

(22) Filed: Mar. 26, 2003

(65) Prior Publication Data

US 2003/0193779 A1 Oct. 16, 2003

(51) Int. Cl.[7] ................................................. H05K 7/20
(52) U.S. Cl. ....................... 361/695; 361/690; 361/697; 174/16.1; 165/80.3; 165/104.33; 165/122; 454/184
(58) Field of Search ................................. 361/690, 694, 361/695, 697; 174/16.1, 16.3; 165/80.3, 104.33, 122; 454/184

(56) References Cited

U.S. PATENT DOCUMENTS 5,734,551 A  *  3/1998  Hileman et al. ............ 361/695
5,852,547 A  * 12/1998  Kitlas et al. ................ 361/695
6,002,586 A  * 12/1999  Chen et al. ................. 361/695
6,058,011 A  *  5/2000  Hardt et al. ................ 361/694
6,229,696 B1 *  5/2001  Lin et al. .................... 361/683
6,414,845 B2 *  7/2002  Bonet ......................... 361/695
6,430,041 B1 *  8/2002  Johnson et al. ............. 361/687
6,556,440 B2 *  4/2003  Jensen et al. ............... 361/687

* cited by examiner

Primary Examiner—Boris Chervinsky

(57) ABSTRACT

A positioning and heat dissipating device of an interface card comprises an operation platform and at least one heat-dissipating module. The heat-dissipating module is fixed to a platform. The heat dissipating effect of the heat-dissipating module is correspondent to the interface card in a casing. The heat-dissipating module has an independent fan and a frame for installing the fan. A plurality of sliding grooves are formed on the frame; each sliding groove being installed with a positioning element movable on the sliding groove. A positioning portion on each positioning element presses a respective interface card so as to achieve the effect of positioning the interface card.

11 Claims, 5 Drawing Sheets

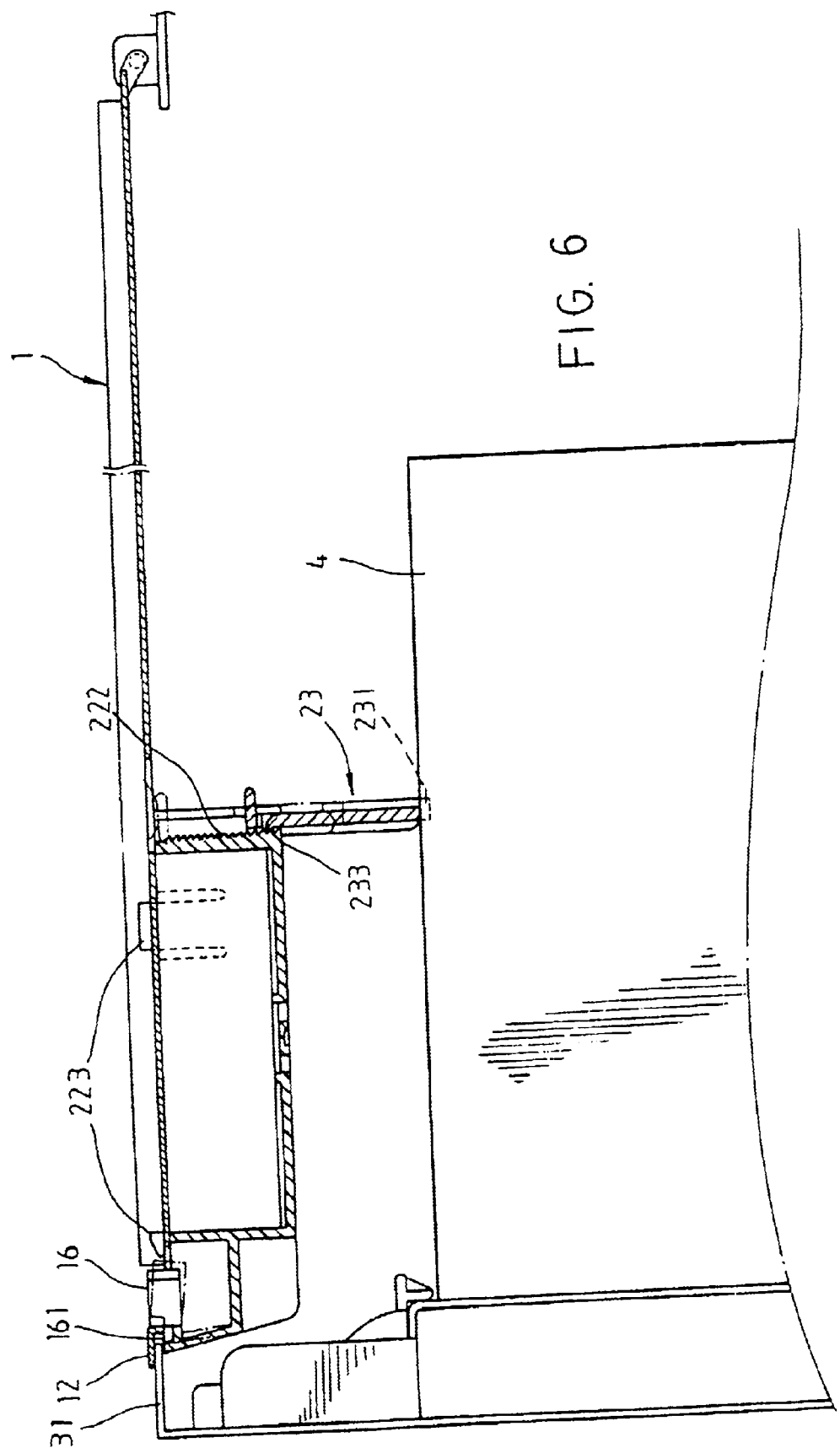

POSITIONING AND HEAT DISSIPATING DEVICE OF INTERFACE CARD

BACKGROUND OF THE INVENTION

1. Field of the Invention

The present invention relates to heat dissipation, and particularly to a positioning and heat dissipating device of an interface card.

2. Description of Related Art

With the improvement of the computer science, more and more interface cards are added to a computer. In general, interface cards are connected to the motherboard and are installed at a concentrated area. Furthermore, the speed of the interface card is increased. Thereby, the temperature in the interface card installing area is increased so that it is, possible that the computer will shutdown improperly. However, in the prior art, the heat dissipation is aimed at the area of CPU and thus motherboard, while the area for installing the interface card is not emphasized.

Furthermore, the interface cards are connected to a computer through card slots. Thereby, it is desirable to have a way for installing the interface card easily and firmly securing the interface card.

SUMMARY OF THE INVENTION

Accordingly, the primary object of the present invention is to provide a positioning and heat dissipating device of an interface card which only occupies a small size in the casing. Especially, the space having the interface card has a better heat dissipating effect.

Another object of the present invention is to provide a positioning and heat dissipating device of an interface card, wherein the heat-dissipating module has a positioning element, the positioning element and heat-dissipating module are movable with respect to one another. Thereby, the interface card can be positioned easily.

To achieve the object, the present invention provides a positioning and heat dissipating device of an interface card comprising an operation platform and at least one heat-dissipating module. The heat-dissipating module is fixed to a platform. The heat dissipating effect of the heat-dissipating module is correspondent to the interface card in a casing. The heat-dissipating module has an independent fan and a frame for installing the fan. A plurality of sliding grooves are, formed on the frame; each sliding groove is installed with a positioning element movable on the sliding groove. A positioning portion on each positioning element presses a respective interface card so as to achieve the effect of positioning the interface card.

The various objects and advantages of the present invention will be more readily understood from the following detailed description when read in conjunction with the appended drawing.

BRIEF DESCRIPTION OF THE DRAWINGS

FIG. 6, shows one embodiment of the positioning element of the present invention.

DETAILED DESCRIPTION OF THE PREFERRED EMBODIMENTS

Figure 1:
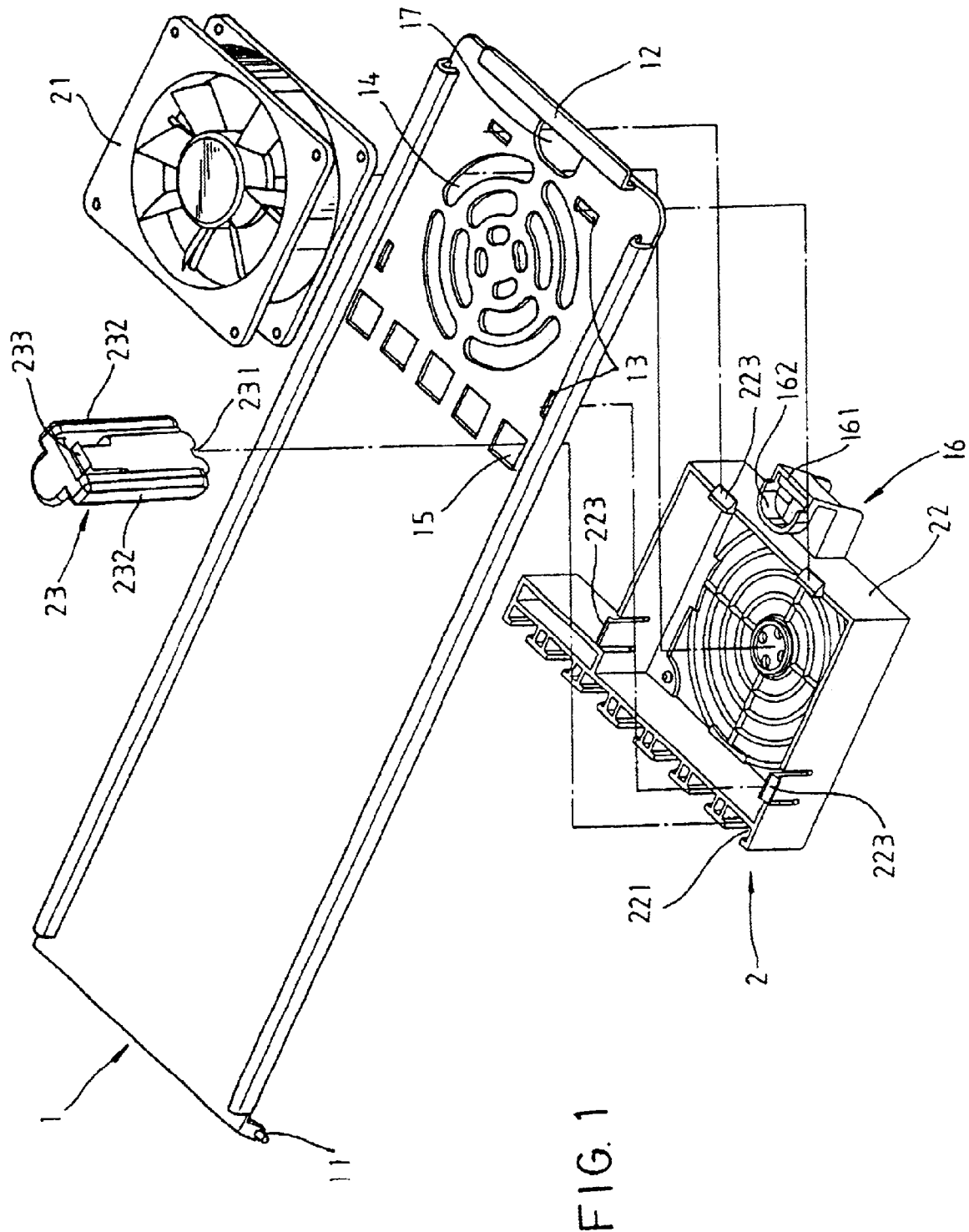
FIG. 1 is an exploded view of one embodiment of the present invention.
Figure 2:
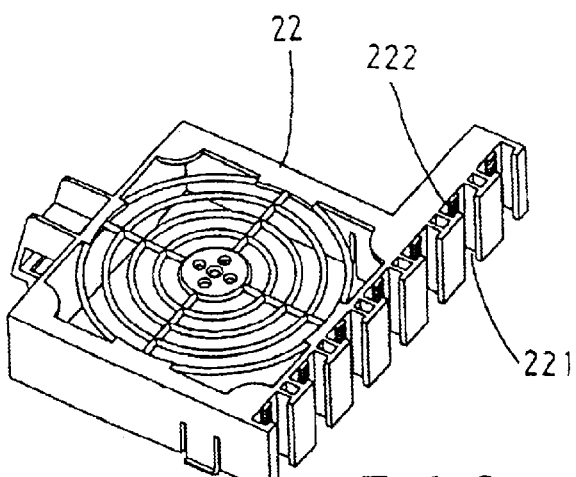
FIG. 2 is a perspective view of one embodiment of the heat-dissipating module of the present invention.
Figure 5:
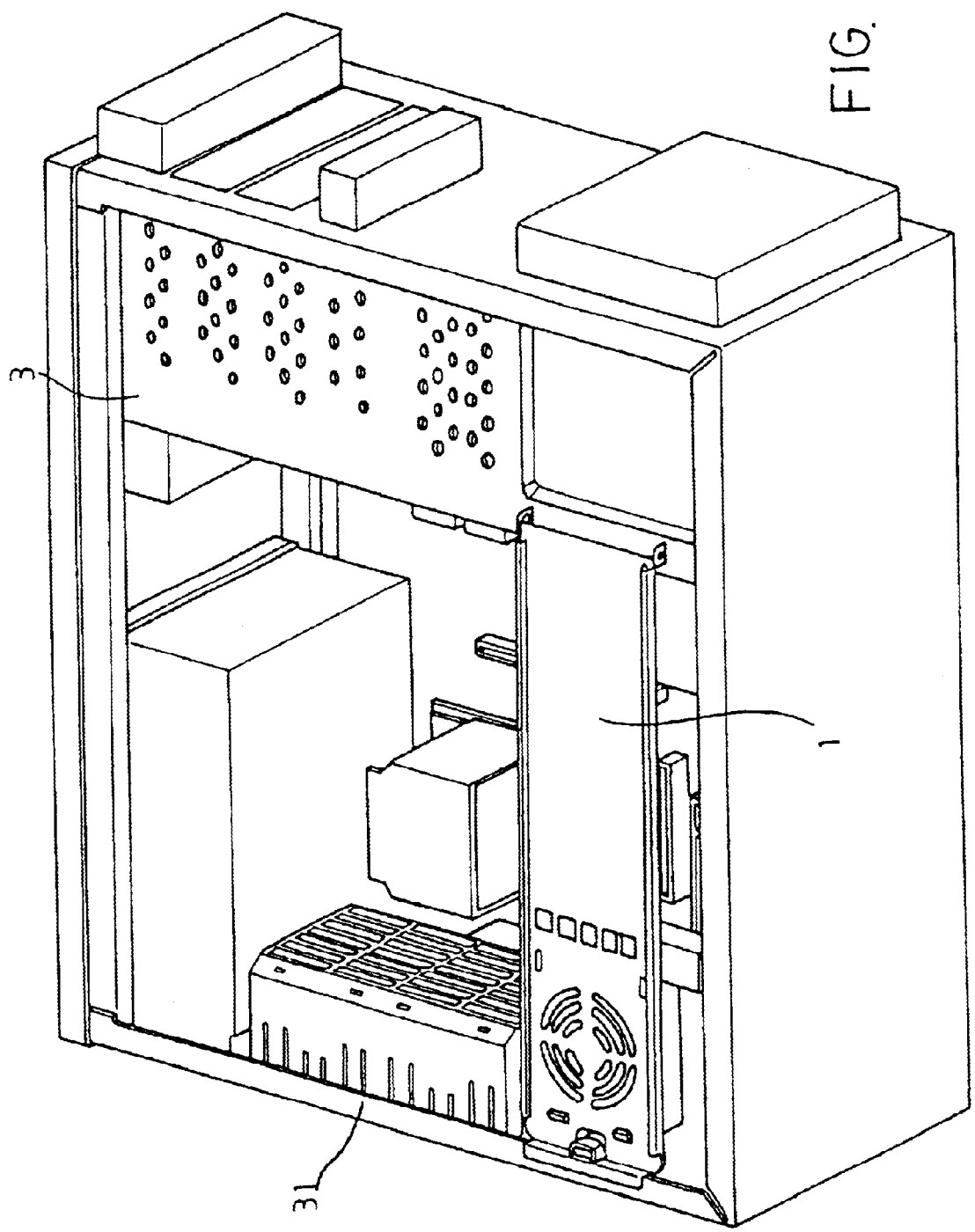
FIG. 5 is a perspective view showing that the present invention is mounted to a casing.

Referring to FIGS. 1 and 2, the exploded perspective view of the present invention is illustrated, wherein the present invention is not assembled to a computer casing 3. The present invention includes an operation platform 1 and at least one heat-dissipating module 2. The heat-dissipating module 2 is fixed to a platform 1. The heat dissipating effect of the heat-dissipating module 2 is corresponding to the interface card 4 in the casing 3 (referring to FIG. 5). The heat-dissipating module 2 has an independent fan 21 and a frame 22 for installing the fan 21. A plurality of sliding grooves 221 are formed on the frame 22. Each sliding groove 221 is installed with a positioning element 23 movable on the sliding groove 221. Especially, the positioning portion 231 on each positioning element 23 presses a respective interface card 4 so as to achieve the effect of positioning the interface card 4.

Figure 3:
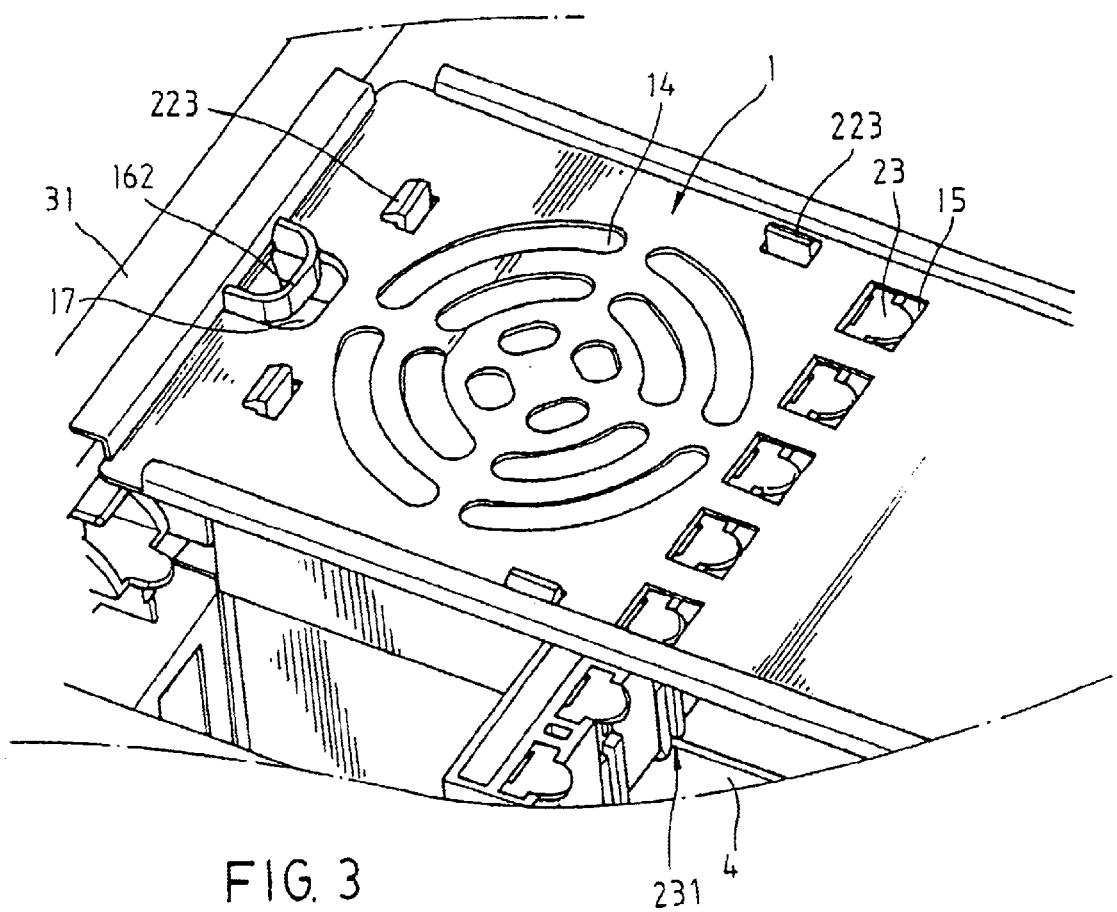
FIG. 3 is an assembled view showing that the present invention is fixed to a computer casing.
Figure 4:
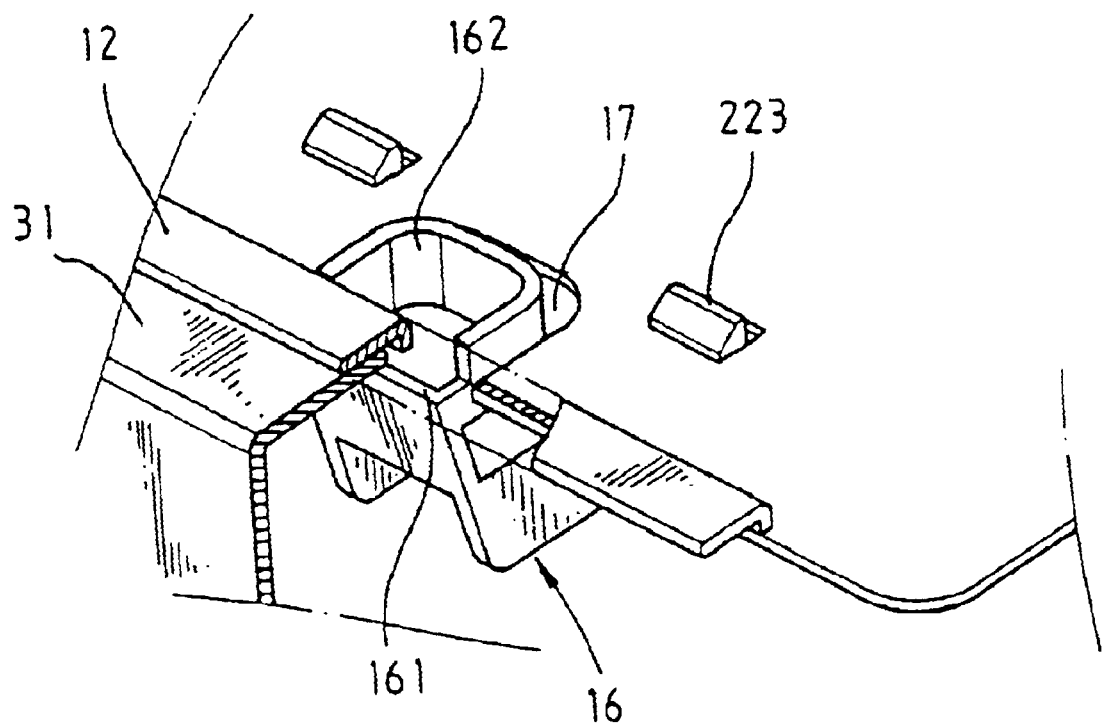
FIG. 4 shows one embodiment that the locking means of the present invention is used to lock the heat dissipating device to a casing.

In above structure, one end of the platform 1 is pivotally installed with a pivotal shaft 11 for being pivotally connected to a computer casing 3. The platform 1 is openable. This design does not hinder the insertion of the interface card 4. Furthermore, the heat-dissipating module 2 may be well protected and easily assembled. Another end of the platform 1 far away from the pivotal connecting end has a protruded edge for resisting against another end 31 of the casing 3 so that the platform 1 can run across the casing (referring to FIGS. 3, 4 and 5). The platform 1 is fixed to the casing 3 by a locking means 16 nearby the edge 12. One end of the locking means 16 is fixed to the positioning element 23 and another end thereof is a free end. The free end is installed with a resisting portion 161 for resisting a lower side of the casing 3 so that the platform 1 will not move upwards. One end of the resisting portion 161 extends with a top plate 162. A connecting portion 163 is mounted between the resisting portion 161 and the locking means 16, thereby, the resisting portion 161 will be driven by then movement of the top plate 162, as illustrated in FIG. 4. The top plate 162 passes through the through hole 17 in the platform 1, but a gap is remained therebetween so that the top plate 162 may move backwards slightly. When the top plate 162 moves backwards, the resisting portion 161 is driven to separate from the casing 3 so that the platform 1 can be opened.

The heat-dissipating module 2 is buckled to a buckling hole 13 of the platform 1 through the hook 223 in the frame 22. Thereby, the heat-dissipating module 2 is fixed to the platform 1. Moreover, the platform 1 has a via hole 14 at position with respect to the heat-dissipating module 2. By the operation of the heat-dissipating module 2, the heat from the interface card 4 may have a convection effect with the environmental air. The platform 1 is installed with penetrating holes 15 with respect to the sliding tracks 232 at the two sides of the positioning element 23. Two sides of the positioning element 23 have sliding tracks 232 which are movable with respect to the sliding grooves 221 of the heat-dissipating module 2. A hook 233 is installed between the two sliding tracks 232. The hook 232 is engagable with the teeth 222 of the heat-dissipating module 2 so that the positioning element 23 can be adjusted to a proper position, as shown in the FIG. 6. A bottom of the positioning element 23 has a positioning portion 231. In this embodiment, the positioning portion 231 is a groove for resisting against the interface card 4 and has a positioning effect.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A positioning and heat dissipating device of an interface card comprising an operation platform and at least one heat-dissipating module fixed to a platform; wherein the heat-dissipating module has an independent fan and a frame for installing the fan; a plurality of sliding grooves are formed on the frame; each sliding groove is installed with a positioning element movable on the sliding groove; a positioning portion on each positioning element presses a respective interface card so as to achieve the effect of positioning the interface card.

2. The positioning and heat dissipating device of an interface card as claimed in claim 1, wherein one end of the platform is pivotally installed with a pivotal shaft for being pivotally connected to one end of a casing; and another end of the platform is a free end so that the platform is openable.

3. The positioning and heat dissipating device of an interface card as claimed in claim 1, wherein the platform has via holes at positions with respect to the heat-dissipating module.

4. The positioning and heat dissipating device of an interface card as claimed in claim 2, wherein the platform has via holes at positions with respect to the heat-dissipating module.

5. The positioning and heat dissipating device of an interface card as claimed in claim 2, wherein another end of the platform far away from the pivotal connecting end has a protruded edge for resisting against another end of the casing so that the platform runs across the casing.

6. The positioning and heat dissipating device of an interface card as claimed in claim 5, wherein the platform is fixed to the casing by a locking means nearby the edge.

7. The positioning and heat dissipating device of an interface card as claim in claim 6, wherein one end of the locking means is fixed to the heat-dissipating module and another end thereof is a free end; the free end is installed with a resisting portion for resisting a lower side of the casing so that the platform will not move upwards, one end of the resisting portion extends with a top plate; a connecting portion is mounted between the resisting, portion and the locking means, thereby, the resisting portion will be driven by the movement of the top plate.

8. The positioning and heat dissipating device of an interface card as claimed in claim 7, wherein the top plate passes through a through hole in the platform, but a gap is remained therebetween so that the top plate can move backwards.

9. The positioning and heat dissipating device of an interface card as claimed in claim 1, wherein two sides of the positioning element have sliding tracks which are movable along the sliding grooves.

10. The positioning and heat dissipating device of an interface card as claimed in claim 9, wherein a hook is installed between the two sliding tracks; the hook is engagable with teeth of the heat-dissipating module so that the positioning element is adjustable.

11. The positioning and heat dissipating device of an interface card as claimed in claim 1, wherein the positioning portion is a groove.

* * * * *